(12) United States Patent
Hwang et al.

(10) Patent No.: US 8,452,170 B2
(45) Date of Patent: May 28, 2013

(54) DIGITAL SINGLE LENS REFLEX CAMERA

(75) Inventors: Seung-hyun Hwang, Yongin-si (KR);
Myung-gyu Kim, Yongin-si (KR)

(73) Assignee: Samsung Electronics Co., Ltd.,
Suwon-si (KR)

( * ) Notice: Subject to any disclaimer, the term of this patent is extended or adjusted under 35 U.S.C. 154(b) by 182 days.

(21) Appl. No.: 13/008,221

(22) Filed: Jan. 18, 2011

(65) Prior Publication Data
US 2011/0187922 A1     Aug. 4, 2011

(30) Foreign Application Priority Data

Feb. 3, 2010  (KR) .......................... 10-2010-0009986

(51) Int. Cl.
*G03B 17/00*     (2006.01)
(52) U.S. Cl.
USPC ........................... 396/301; 396/529; 396/542
(58) Field of Classification Search
USPC .................. 396/301, 529, 532, 542; 348/360
See application file for complete search history.

(56) References Cited

U.S. PATENT DOCUMENTS

| | | | | |
|---|---|---|---|---|
| 4,999,659 A | * | 3/1991 | Fukahori et al. | 396/532 |
| 5,177,520 A | * | 1/1993 | Kohno et al. | 396/129 |
| 6,112,034 A | * | 8/2000 | Takao et al. | 396/542 |

* cited by examiner

*Primary Examiner* — WB Perkey
(74) *Attorney, Agent, or Firm* — Drinker Biddle & Reath LLP (57) ABSTRACT

To simplify and miniaturize an interface structure for power supply and signal transmission and reception between a camera body and a lens unit and reduce operation restrictions of the interface structure, a digital single lens reflex (DSLR) camera includes a camera body and a lens unit which is attached to or detached from the camera body, in which the camera body includes interface pins formed contactable with the lens unit, the interface pins including power pins and signal pins, a pin housing that receives therein the interface pins, a flexible printed circuit board (FPCB) including a first pattern portion electrically connected with the power pins and a second pattern portion electrically connected with the signal pins, and a lead wire electrically connected with the first pattern portion.

31 Claims, 8 Drawing Sheets

DIGITAL SINGLE LENS REFLEX CAMERA

CROSS-REFERENCE TO RELATED PATENT APPLICATION

This application claims the priority benefit of Korean Patent Application No. 10-2010-0009986, filed on Feb. 3, 2010, in the Korean Intellectual Property Office, the disclosure of which is incorporated herein in its entirety by reference.

BACKGROUND

1. Field of the Invention

Embodiments relate to a digital single lens reflex (DSLR) camera, and more particularly, to a DSLR camera having an interface module in which power supply and signal transmission/reception between a camera body and a lens unit are simply and easily performed.

2. Description of the Related Art

Beginners can take photographs like professional photographers due to the popularization of digital single lens reflex (DSLR) cameras, which are single lens reflex cameras that take digital photographs.

Here, a single lens reflex refers to a method of transmitting an image of a subject to a viewfinder through a lens or transmitting light to a sensor that takes pictures. On the other hand, generally used digital cameras are binocular. Therefore, an image seen on a generally used digital camera is different from an image photographed with the generally used digital camera. As a result, a user can capture an image transmitted to a sensor, seeing the image on a screen.

Such a conventional DSLR camera is fabricated, in which a mirror is installed to revolve on an optical axis of a lens with respect to a shaft, within a predetermined angle. At ordinary times, light of a subject, which passes through a lens unit, is reflected from the mirror and imaged on a focus plate, so that a photographer can check the image of the subject, which is imaged on the focus plate, by using a pentaprism and a viewfinder. In this case, if a shutter-release signal is input, the mirror moves upward in order to retreat from the optical axis of the lens unit while revolving on the optical axis within the predetermined range. When a shutter is driven to be open under control of a shutter driving circuit, the image of the subject is formed on an imaging device.

In such a conventional single lens reflex camera, a camera body and a lens unit are generally provided to be removable. When the camera body and the lens unit are coupled to each other, an interface module is usually formed between the camera body and the lens unit so that power is supplied from the camera body to the lens unit and a signal is transmitted and received between the camera body and the lens unit.

SUMMARY

Embodiments include a digital single lens reflex (DSLR) camera in which an interface structure for power supply and signal transmission and reception between a camera body and a lens unit is simplified and miniaturized and the operation restrictions of the interface structure are reduced.

According to an embodiment, a digital single lens reflex (DSLR) camera includes a camera body and a lens unit which is attached to or detached from the camera body. The camera body includes interface pins formed contactable with the lens unit, the interface pins including power pins and signal pins; a pin housing that receives therein the interface pins; a flexible printed circuit board (FPCB) including a first pattern portion electrically connected with the power pins and a second pattern portion electrically connected with the signal pins; and a lead wire electrically connected with the first pattern portion.

The first pattern portion and the second pattern portion may be formed to be spaced apart from each other.

The power pins may be electrically connected with a side of the first pattern portion, and the lead wire may be electrically connected with another side of the first pattern portion.

The power pins may be connected with the first pattern portion by soldering.

The lead wire may be connected with a power supply unit of the DSLR camera.

The first pattern portion may be formed to be bent in a shape of approximately 'U'.

The second pattern portion may be connected with a control unit of the DSLR camera.

A pattern related to power may be formed in the first pattern portion, and a pattern related to an electric signal may be formed in the second pattern portion.

A plurality of via holes may be formed in the pin housing, and the interface pins may be received in the plurality of via holes.

The signal pins may contact the second pattern portion when the camera body is coupled with the lens unit, and the signal pins may be separated from the second pattern portion when the camera body is separated from the lens unit.

Springs that provide predetermined elastic force may be inserted into the interface pins, respectively.

The springs may provide the predetermined elastic force in a direction urging the interface pins to protrude from the camera body.

The power pins may be formed to have a longer length than the signal pins.

BRIEF DESCRIPTION OF THE DRAWINGS

The above and other features and advantages will become more apparent by describing in detail exemplary embodiments with reference to the attached drawings in which.

DETAILED DESCRIPTION

Exemplary embodiments will now be described in detail with reference to the attached drawings.

Figure 1:
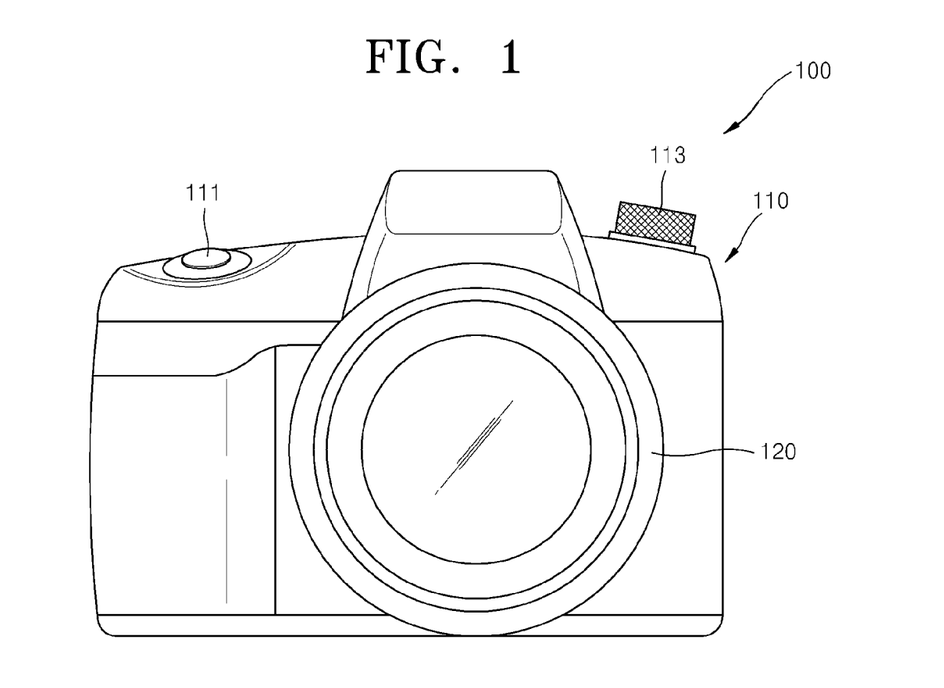
FIG. 1 is a front view of a digital single lens reflex (DSLR) camera, according to an embodiment.

FIG. 1 is a front view of a digital single lens reflex (DSLR) camera 100, according to an embodiment.

Referring to FIG. 1, the DSLR camera 100 includes a camera body 110 and a lens unit 120. A shutter-release button 111 and a mode dial 113 are also included on a front side of the camera body 110.

The shutter-release button 111 of the DSLR camera 100 opens and closes an image-obtaining element, e.g., a charge-coupled device (CCD) or a complementary metal oxide semiconductor (CMOS), to expose the image-obtaining element to light for a predetermined time. The shutter-release button 111 also operates along with a diaphragm (not shown) to appropriately expose a subject so as to record an image of the subject in the image-obtaining element.

The shutter-release button 111 generates first and second image photographing signals from an input of a photographer. If the first image photographing signal is input as a half-shutter signal, the DSLR camera 100 controls an amount of light on a focal point. When the focal point is completely adjusted and the amount of the light is completely controlled by the input of the first image photographing signal, the second image photographing signal is input as a whole-shutter signal to capture an image.

The mode dial 113 is pressed to select a photographing mode. The mode dial 113 of the DSLR camera 100 supports an auto (auto photographing) mode, a scene mode, an effect mode, an A/S/M mode, etc. The auto mode is used to minimize setups of a user and rapidly and conveniently photograph an image according to the intentions of the user. The scene mode is used to simply optimally set a camera according to photographing conditions or conditions of a subject. The effect mode is used to give a special effect to image photographing, for example, effects such as continuous photographing, scene photographing, etc. The A/S/M mode is used to manually set various functions including the speeds of a diaphragm and a shutter to photograph an image. However, these modes should not be construed as limiting.

The lens unit 120 receives light from an external light source to process the image.

Figure 2:
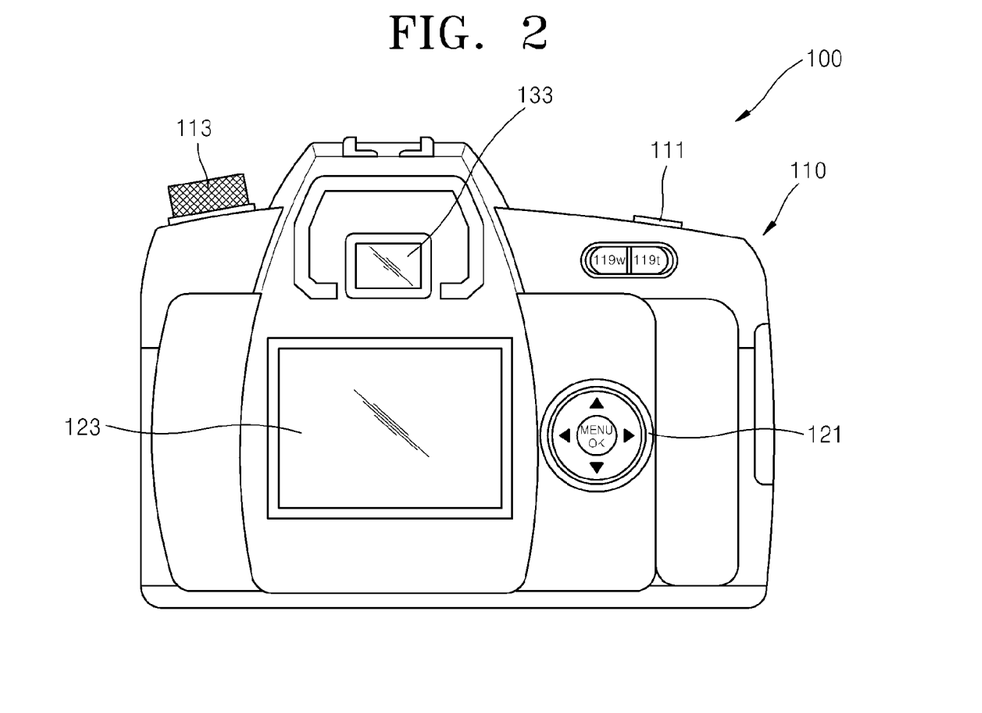
FIG. 2 is a rear view of the DSLR camera of FIG. 1, according to an embodiment.

FIG. 2 is a rear view of the DSLR camera 100 of FIG. 1, according to an embodiment.

Referring to FIG. 2, a viewfinder 133, a wide angle-zoom button 119w, a telephoto-zoom button 119t, a function button 121, and a display unit 123 are installed on a rear side of the DSLR camera 100.

The viewfinder 133 of the DSLR camera 100 is a display screen through which a composition of a subject to be photographed is set.

The wide angle-zoom button 119w and the telephoto-zoom button 119t are respectively pressed to widen or narrow a view angle, and in particular, may be pressed to change the size of a selected exposed area. When the wide angle zoom-button 119w is pressed, the size of the selected exposed area is reduced. When the telephoto-zoom button 119t is pressed, the size of the selected exposed area is increased.

The function button 121 includes up, down, left, right, and MENU/OK buttons, i.e., a total of five buttons. The function button 121 is pressed to execute various menus related to operations of the DSLR camera 100. The up, down, left, right, and MENU/OK buttons may be used as shortcut keys, and the functions of the function button 121 may vary according to manufacturing companies.

Figure 3:
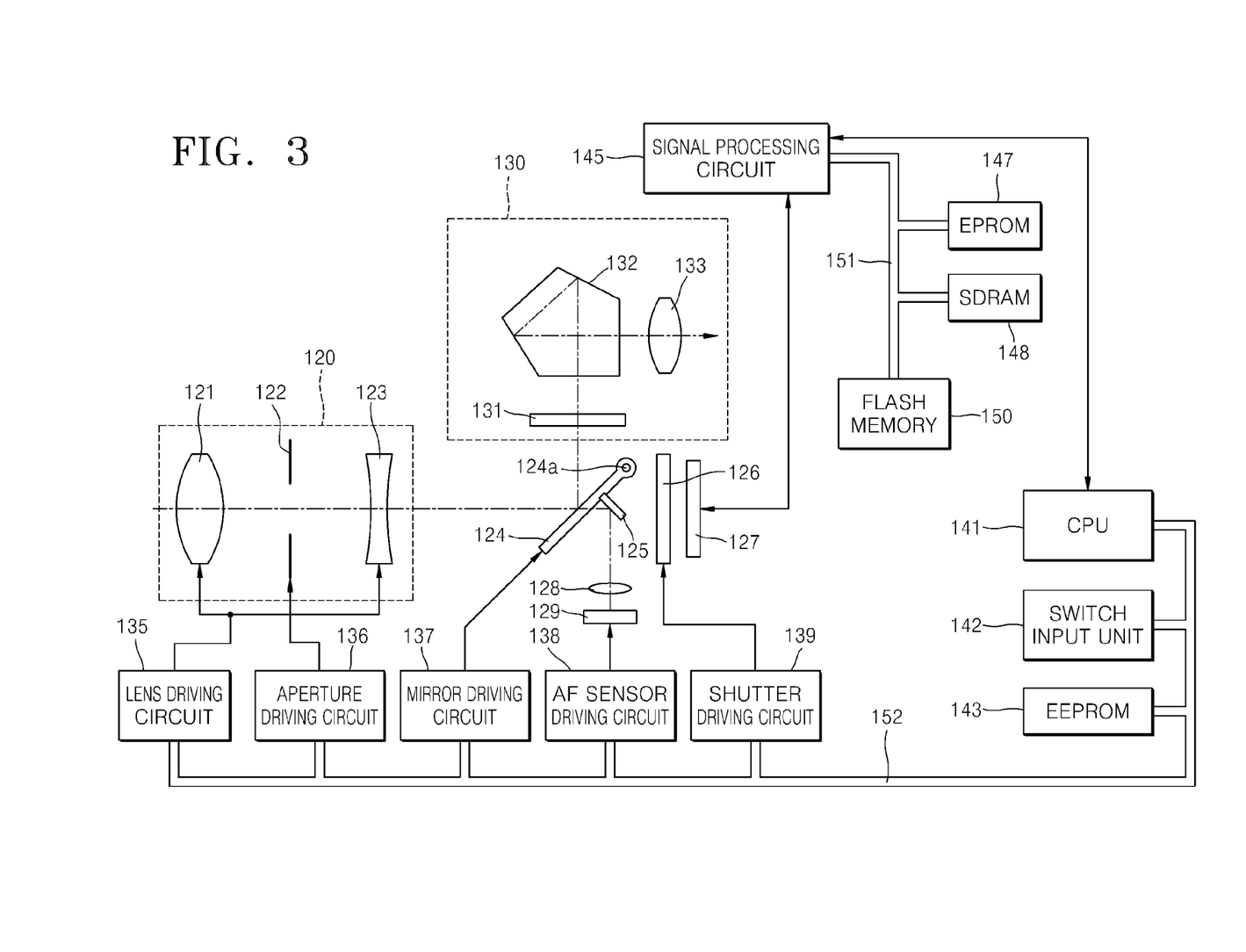
FIG. 3 is a block diagram of a DSLR camera, according to an embodiment.

FIG. 3 is a block diagram of a DSLR camera 100, according to an embodiment.

Referring to FIG. 3, the DSLR camera 100 includes a central processing unit (CPU) 141, and a plurality of elements, e.g., a lens unit 120, a shutter 126, an imaging device 127, and a finder optical system 130. The CPU 141 is a control unit that controls the overall operations of the DSLR camera 100, and the plurality of elements operate according to a control signal received from the CPU 141.

The lens unit 120 includes first and second lenses 121 and 123 and a diaphragm 122 that is disposed between the first and second lenses 121 and 123. Thus, the first and second lenses 121 and 123 of the lens unit 120 are driven by a lens driving circuit 135, and the diaphragm 122 is driven by a diaphragm driving circuit 136.

A mirror 124 is formed in the rear of the second lens 123, on an optical axis of the first and second lenses 121 and 123. A central portion of the mirror 124 is formed as a half mirror. The mirror 124 may revolve with respect to a shaft 124a, within a predetermined angle.

A sub mirror 125 is formed on a rear side of the mirror 124. A portion of light incident on the lens unit 120 penetrates the mirror 124 and then is reflected from the sub mirror 125. A separator optical system 128 is disposed on an axis of the light reflected from the sub mirror 125 so as to separate an image into two images. An auto focus (AF) sensor 129 is disposed in an imaging position of a subject, which is formed by the separator optical system 128. The AF sensor 129 is connected to an AF sensor driving circuit 138.

The sub mirror 125, the separator optical system 128, and the AF sensor 129 constitute an apparatus for detecting a focus according to a well-known phase difference method. The AF sensor driving circuit 138 drives the AF sensor 129 under control of the CPU 141. That is, the CPU 141 calculates a defocus amount based on an image signal generated by the AF sensor 129, and controls the lens driving circuit 135 using the calculated defocus amount to drive the first and second lenses 121 and 123 of the lens unit 120 so as to adjust a focal point. Here, the lens driving circuit 135 includes a driving source, such as an electronic motor or an ultrasonic motor, a driver circuit for controlling the driving source, and an encoder device for detecting a position of a lens.

The finder optical system 130 is disposed in a path of the light reflected from the mirror 124, and includes a focal plate 131, a pentaprism 132, the viewfinder 133, and a display device (not shown). Light of the subject, which is obtained from the first and second lenses 121 and 123 of the lens unit 120, is reflected from the mirror 124 and then imaged on the focal plate 131. A photographer may check an image of a subject, which has been imaged on the focal plate 131, using the pentaprism 132 and the viewfinder 133.

The mirror 124 and the sub mirror 125 may revolve with respect to the shaft 124a of the mirror 124 within a predetermined range due to a mirror driving circuit 137 so as to retreat from the optical axis of the first and second lenses 121 and 123 of the lens unit 120. Also, the shutter 126 and the imaging device 127 are disposed in the rear of the mirror 124, on the optical axis of the lens unit 120.

The shutter 126 is driven to be open for a predetermined time under control of a shutter driving circuit 139 so that the imaging device 127 images the subject. That is, the mirror 124 is driven to move upward in order to retreat from the optical axis of the lens unit 120 under control of the mirror driving circuit 137. If the shutter 126 is open under control of the shutter driving circuit 139, the image of the subject is formed on the imaging device 127.

The lens driving circuit 135, the diaphragm driving circuit 136, the mirror driving circuit 137, the AF sensor driving circuit 138, and the shutter driving circuit 139 are connected to the CPU 141 having a micro-processor, via a data bus 152.

A switch input unit 142 and an electrically erasable programmable read-only memory (EEPROM) 143 which is non-volatile memory are also connected to the CPU 141 via the data bus 152.

The switch input unit 142 includes first and second release switches, and a plurality of switches including a power switch operating when a power button (not shown) is pressed. The first release switch is switched on in response to a first image photographing signal, which is a half-shutter signal generated by the shutter-release button 111 of the DSLR camera 100 of FIG. 1. The second release switch is switched on in response to a second image photographing signal, which is a whole-shutter signal generated by the shutter-release button 111. A manipulation signal generated through a manipulation of a switch installed on a side of the switch input unit 142 is supplied to the CPU 141.

When the first release switch is switched on, the CPU 141 drives the AF sensor driving circuit 138 to calculate the distance between the two images formed on the AF sensor 129. Also, the CPU 141 drives the lens driving circuit 135 based on data regarding the distance to adjust focal points of the first and second lenses 121 and 123 of the lens unit 120.

When the second release switch is switched on, the CPU 141 drives the mirror driving circuit 137 to retreat the mirror 124 from the optical axis of the lens unit 120, while calculating an appropriate cross-section contraction value and a shutter exposure time based on luminance information of the subject, which is based on an output of the AF sensor 129. In addition, the CPU 141 drives the diaphragm driving circuit 136 by using the appropriate cross-section contraction value in order to drive the diaphragm 122, and drives the shutter driving circuit 137 by using the shutter exposure time in order to drive the shutter 126.

When the image of the subject is formed on an imaging plane of the imaging device 127 according to the above-described operations, the image of the subject is converted into an analog image signal. Then, the analog image signal is converted into a digital image signal by a signal processing circuit 145.

The signal processing circuit 145 is connected to an erasable programmable read-only memory (EPROM) 147, a synchronous dynamic random access memory (SDRAM) 148, and a flash memory 150 via a data bus 151.

The EPROM 147 stores programs that are executed by a processor of the signal processing circuit 145. The SDRAM 148 temporarily stores image data generated before image processing or image data generated during image processing. The flash memory 150 is a non-volatile memory that stores image data that is finally determined. The SDRAM 148 is a volatile memory that temporarily stores information and operates at a high speed but if the supply of power to the SDRAM 148 is stopped, information stored in the SDRAM 148 is lost. The flash memory 150 is a non-volatile memory and operates at a low speed but even if the supply of power to the memory 150 is stopped, information stored in the flash memory 150 is preserved.

An interface structure between a camera body and a lens unit of a DSLR camera according to an embodiment will now be described in greater detail.

Figure 4:
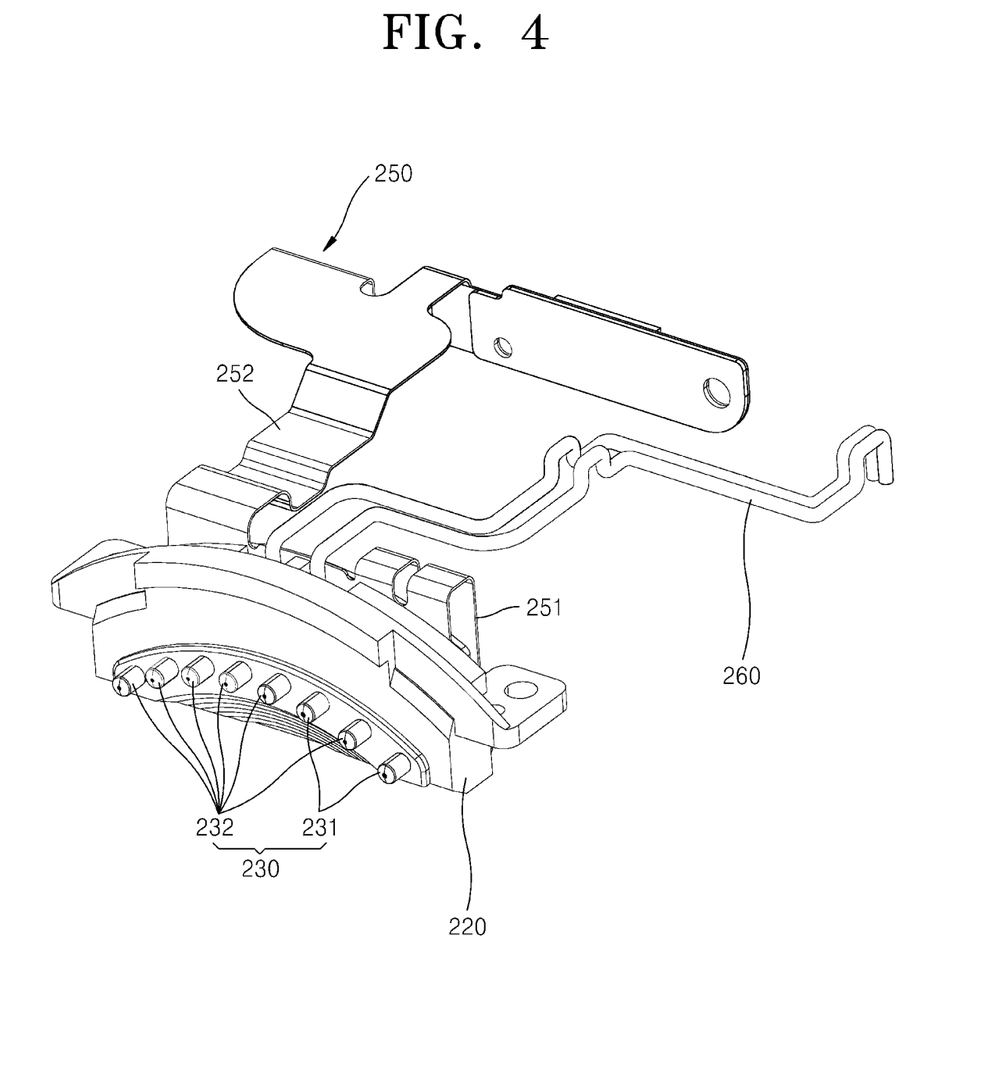
FIG. 4 is a perspective view of an interface structure between a camera body and a lens unit of a DSLR camera, according to an embodiment.
Figure 5:
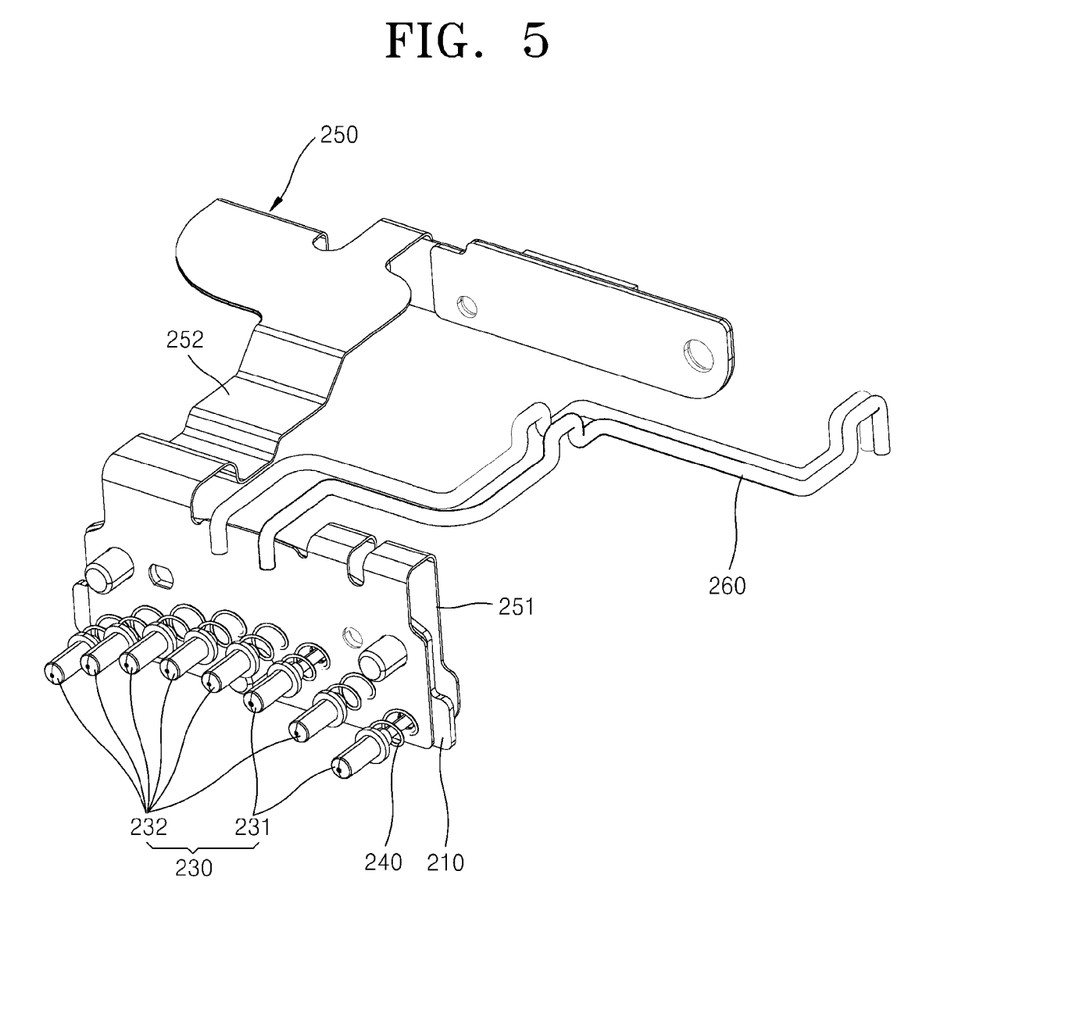
FIG. 5 is a perspective view showing the interface structure of FIG. 4 from which a pin housing is removed, according to an embodiment.
Figure 6:
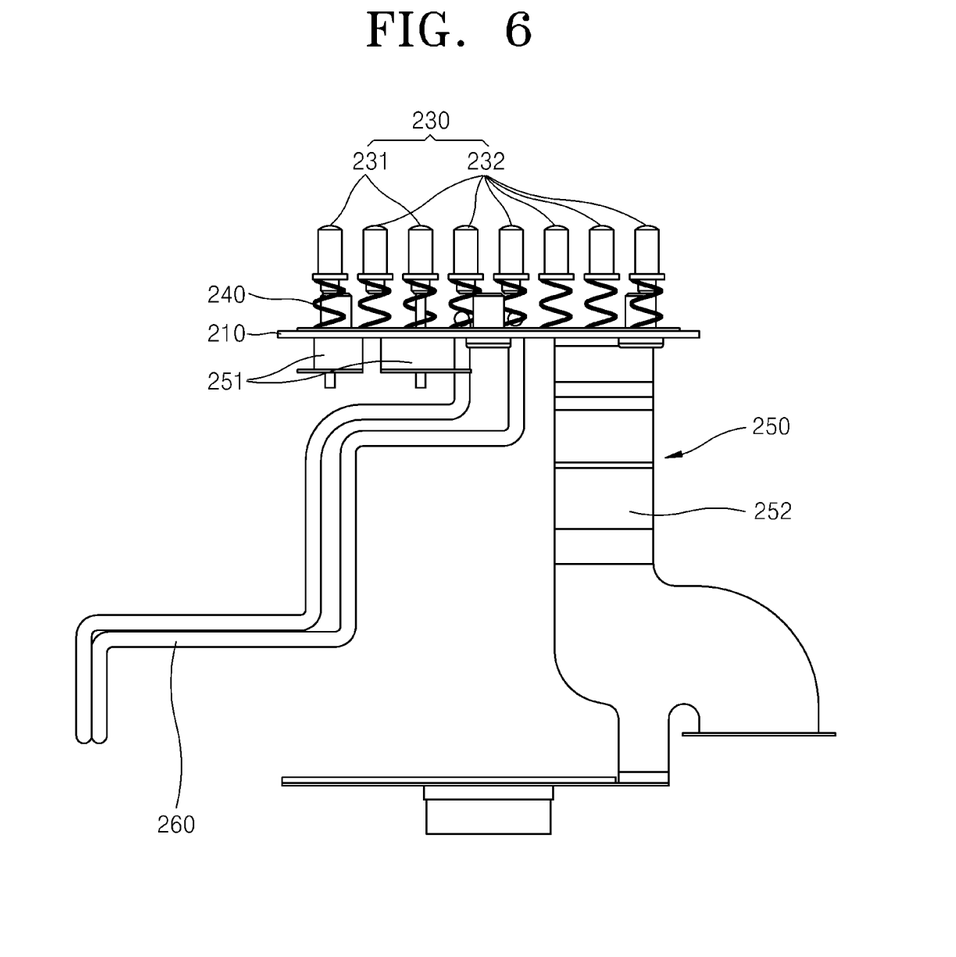
FIG. 6 is a side view of the interface structure of FIG. 5, according to an embodiment.
Figure 7:
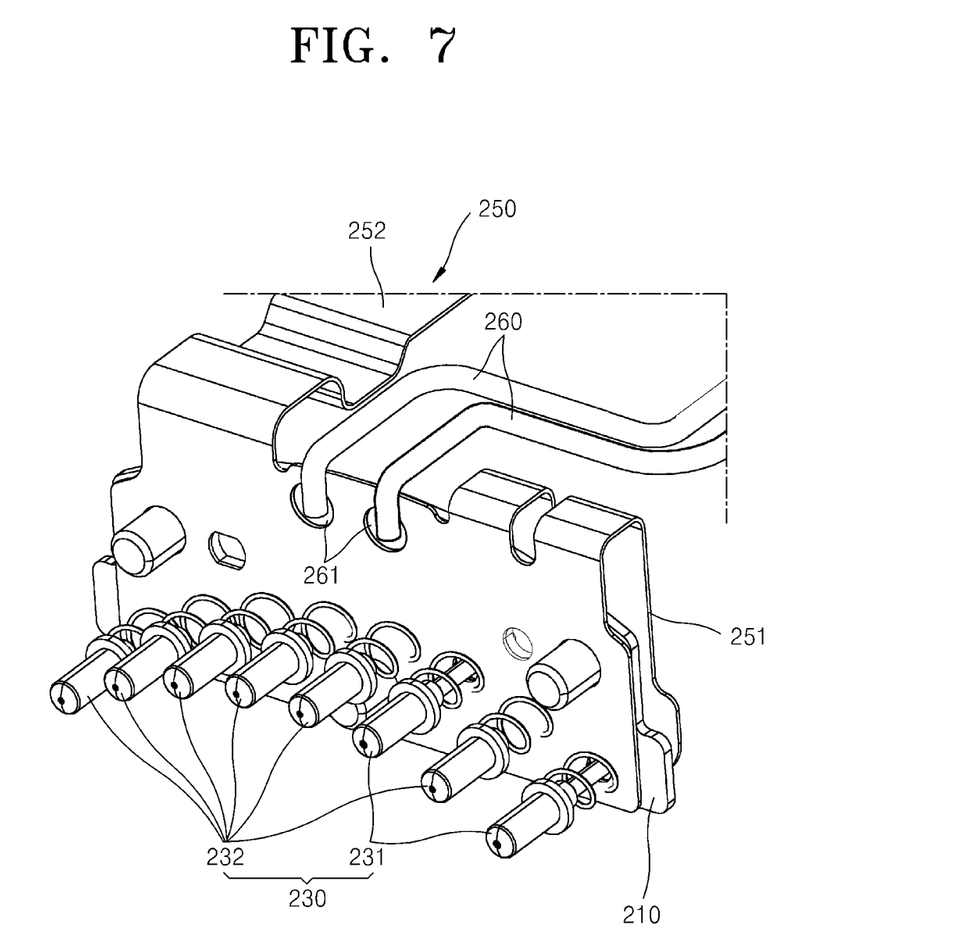
FIG. 7 is a partial front perspective view showing a coupling relationship between a flexible printed circuit board (FPCB) and a lead wire in the interface structure of FIG. 4, according to an embodiment.
Figure 8:
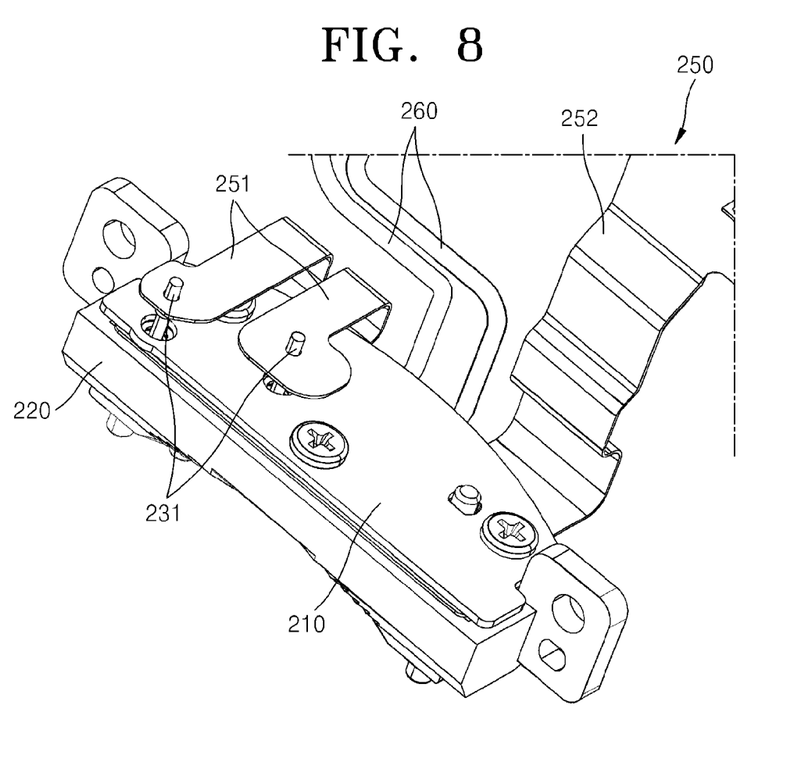
FIG. 8 is a partial rear perspective view showing a coupling relationship between an FPCB and interface pins in the interface structure of FIG. 4, according to an embodiment.
Figure 9:
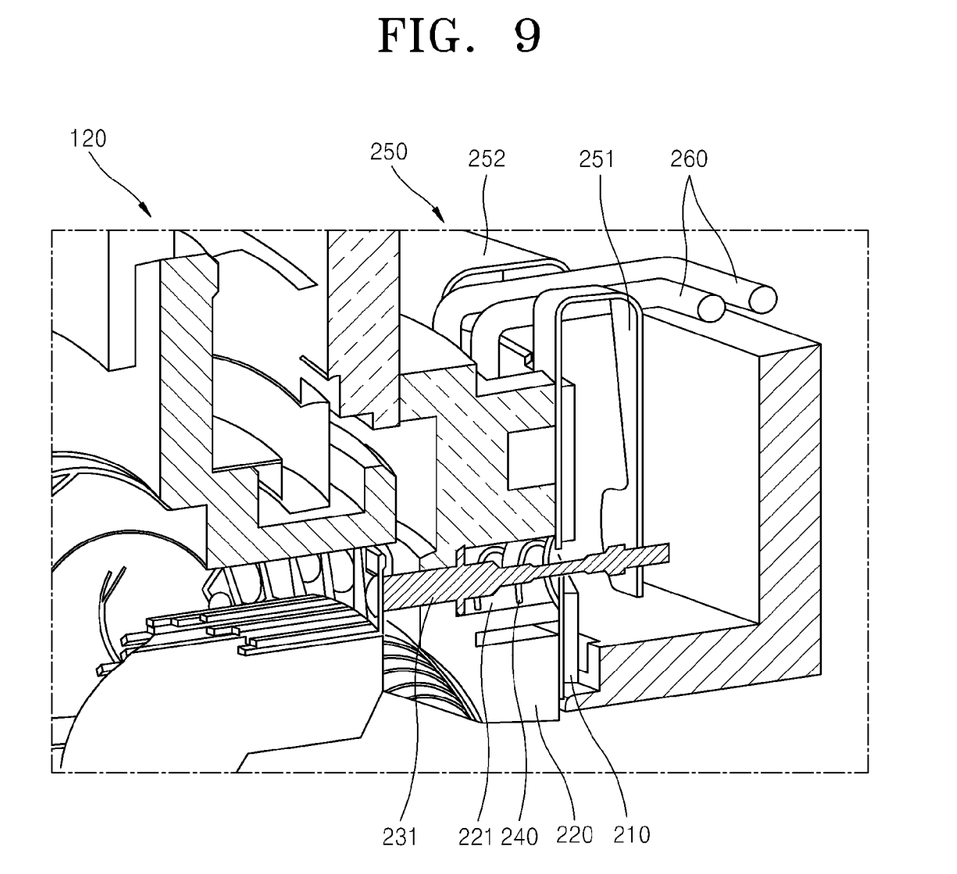
FIG. 9 is a perspective cross-sectional view showing a state where the interface structure of FIG. 4 and a lens unit are coupled to each other, according to an embodiment.

FIG. 4 is a perspective view of an interface structure between a camera body and a lens unit of a DSLR camera, according to an embodiment. FIG. 5 is a perspective view showing the interface structure of FIG. 4 from which a pin housing is removed, according to an embodiment. FIG. 6 is a side view of the interface structure of FIG. 5, according to an embodiment. FIG. 7 is a partial front perspective view showing a coupling relationship between a flexible printed circuit board (FPCB) and a lead wire in the interface structure of FIG. 4, according to an embodiment. FIG. 8 is a partial rear perspective view showing a coupling relationship between an FPCB and interface pins in the interface structure of FIG. 4, according to an embodiment. FIG. 9 is a perspective cross-sectional view showing a state where the interface structure of FIG. 4 and a lens unit are coupled to each other, according to an embodiment.

Referring to FIGS. 4 through 6, an interface module between a camera body and a lens unit of a DSLR camera according to an embodiment includes a pin plate 210, a pin housing 220, interface pins 230, a spring 240, an FPCB 250, and a lead wire 260.

More specifically, it is general in a DSLR camera that a camera body and a lens unit are provided to be detachable. When the camera body and the lens unit are coupled to each other, power necessary for driving of the lens unit is supplied and a signal is transmitted and received between the camera body and the lens unit (120 of FIG. 1) through an interface module provided in the camera body.

Here, in a conventional DSLR camera, to implement an interface structure between a camera body and a lens unit, a power source and interface pins are connected by a lead wire or the power source and the interface pins are connected by a large-width FPCB for a large-width pattern. In the former case, the operation of the interface pins is not smooth because of the tension of the lead wire, whereas in the latter case, structural restrictions occur due to size increases in the FPCB and a connector.

To solve those problems, in an FPCB according to an embodiment, a pattern related to an electric signal and a pattern related to electric power are separately provided. That is, to simultaneously solve a problem that may occur due to the direct connection of the lead wire to the interface pins and a problem of structural restrictions that may occur due to a size increase in the FPCB, the FPCB is partially used only in an operation-requiring part, thus reducing the width of the FPCB connected to a main power supply unit and the size of a connector in the interface module.

To be more specific, the pin plate 210 is formed in the shape of a flat panel, and supports the position of the FPCB 250.

The pin housing 220 is formed in the shape of an approximately rectangular parallelepiped. The pin housing 220 is coupled onto the pin plate 210 and has formed therein a plurality of via holes 221 of FIG. 9 which correspond to the interface pins 230 to be described below. The interface pins 230 are received in the via holes 221. When the camera body 110 of FIG. 1 and the lens unit 120 of FIG. 1 are separated, the moving path of the interface pins 230 is guided by the via holes 221.

The interface pins 230 contact a contact portion (not shown) provided in the lens unit 120. Here, the interface pins 230 include power pins 231 and signal pins 232.

Two power pins 231 are provided and may have a relatively long length so that end portions of the power pins 231 protrude to the rear side of a first pattern portion 251 of the FPCB 250. As shown in FIG. 8, the end portions of the power pins 231 protruding to the rear side of the first pattern portion 251 of the FPCB 250 may be electrically connected to the first pattern portion 251 of the FPCB 250 by soldering or the like.

Six signal pins 232 are provided and may have a relatively short length. Thus, the signal pins 232 are not in contact with the FPCB 250 at ordinary times, but come in contact with the FPCB 250 only when the lens unit 120 pushes the signal pins 232 by coupling between the camera body 110 and the lens unit 120.

In other words, as shown in FIGS. 6 and 7, since springs 240 are disposed between the signal pins 232 and the FPCB 250 and apply predetermined elastic force in a direction urging the signal pins 232 away from the FPCB 250, the signal pins 232 and the FPCB 250 are not in contact with each other at ordinary times. However, once the lens unit 120 pushes the signal pins 232, the signal pins 232 come into contact with the FPCB 250 by overcoming the elastic force provided by the springs 240, thereby facilitating transmission and reception of an electric signal between the camera body 110 and the lens unit 120.

Although two power pins 231 and six signal pins 232 are shown by way of example, this example should not be construed as limiting and the number and shapes of pins may vary according to the specifications required by the DSLR camera.

The springs 240 are inserted into the interface pins 230 to provide predetermined elastic force to the interface pins 230 in a predetermined direction. In other words, as described above, since the springs 240 provide predetermined elastic force in a direction urging the interface pins 230 away from the FPCB 250, the signal pins 232 and the FPCB 250 are not in contact with each other at ordinary times. However, when the lens unit 120 pushes the signal pins 232, the signal pins 232 overcome the elastic force provided by the springs 240 and thus come into contact with the FPCB 250. Since the power pins 231 are coupled to the FPCB 250 by soldering or the like, the power pins 231 are electrically connected to the FPCB 250 at all times regardless of whether the springs 240 provide elastic force to the power pins 231.

The FPCB 250 refers to an original board of a circuit board coated with a flexibly bent copper foil. In the FPCB 250 according to an embodiment, the first pattern portion 251 related to power supply and a second pattern portion 252 related to an electric signal are formed to be separate from each other.

More specifically, in a region of the FPCB 250, a region to which the power pins 231 are coupled is bent in the shape of approximately 'U' to form the first pattern portion 251. Thus, as shown in FIG. 8, the end portions of the power pins 231 inserted through into a side of the 'U'-shape first pattern portion 251 protrude to a side opposite to the FPCB 250, and the protruding power pins 231 are connected to a 'U'-shape opposite surface of the FPCB 250 by soldering or the like. Although not shown in the figures, an end portion of the lead wire 260 is electrically connected to the first pattern portion 251 by soldering or the like and another portion of the lead wire 260 is connected to a power supply unit (not shown).

As such, in the region of the FPCB 250, the first pattern portion 251 on which the power pins 231 are mounted is bent in the shape of approximately 'U', thereby facilitating the operation of the power pins 231 during coupling between the camera body and the lens unit.

In the region of the FPCB 250, in a region contacting the signal pins 232 is formed a pattern related to an electric signal. This pattern is also electrically connected to the second pattern portion 252. The second pattern portion 252 is connected to a central processing unit (CPU) 141 of FIG. 3 which is a main control unit.

In this way, the FPCB 250 is formed to include the first pattern portion 251 related to power supply and the second pattern portion 252 related to an electric signal, thereby reducing the width of the FPCB 250 connected to a main power supply unit and the size of a connector in the interface module.

That is, in a conventional DSLR camera, a pattern connected to power pins requires a wide width, increasing the width of an FPCB. The size of a connector of a main control unit connected to the FPCB also increases. However, in the DSLR camera according to an embodiment, the FPCB 250 is partially used only in an operation-requiring part, thereby reducing the width of the FPCB 250 connected to the main power supply unit and the size of the connector in the interface module.

Moreover, in a conventional DSLR camera, a lead wire is directly connected to power pins, and thus the operation of interface pins is not smooth because of being restricted by the tension of the wire. However, in the DSLR camera according to an embodiment, by partially using the FPCB 250 only in an operation-requiring part, the operation restriction of the interface pins can be reduced through a more flexible operation of the FPCB 250 than the tension-inducing wire.

According to various embodiments, an interface structure for power supply and signal transmission and reception between a camera body and a lens unit is simplified and miniaturized and operation restrictions of the interface structure can be reduced.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all equivalent means and differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A lens detachable camera comprising:
   a camera body; and
   a lens unit which is attached to or detached from the camera body,
   wherein the camera body comprises:
      interface pins formed contactable with the lens unit, the interface pins comprising power pins and signal pins;
      a pin housing that receives therein the interface pins;
      a flexible printed circuit board (FPCB) comprising a first pattern portion electrically connected with the power pins and a second pattern portion electrically connected with the signal pins; and
      a lead wire electrically connected with the first pattern portion, wherein the power pins are electrically connected with a side of the first pattern portion by soldering, and the lead wire is electrically connected with another side of the first pattern portion.

2. The lens detachable camera of claim 1, wherein the lead wire is connected with a power supply unit of the lens detachable camera.

3. The lens detachable camera of claim 1, wherein the first pattern portion is formed to be bent in a shape of approximately 'U'.

4. The lens detachable camera of claim 1, wherein the second pattern portion is connected with a control unit of the lens detachable camera.

5. The lens detachable camera of claim 1, wherein a pattern related to power is formed in the first pattern portion, and a pattern related to an electric signal is formed in the second pattern portion.

6. The lens detachable camera of claim 1, wherein a plurality of via holes are formed in the pin housing, and the interface pins are received in the plurality of via holes.

7. The lens detachable camera of claim 1, wherein the signal pins contact the second pattern portion when the camera body is coupled with the lens unit, and the signal pins are separated from the second pattern portion when the camera body is separated from the lens unit.

8. The lens detachable camera of claim 1, wherein springs that provide predetermined elastic force are inserted into the interface pins, respectively.

9. The lens detachable camera of claim 8, wherein the springs provide the predetermined elastic force in a direction urging the interface pins to protrude from the camera body.

10. The lens detachable camera of claim 1, wherein the power pins are formed to have a longer length than the signal pins.

11. A lens detachable camera comprising:
    a camera body; and
    a lens unit which is attached to or detached from the camera body,
    wherein the camera body comprises:
       interface pins formed contactable with the lens unit, the interface pins comprising power pins and signal pins;
       a pin housing that receives therein the interface pins;
       a flexible printed circuit board (FPCB) comprising a first pattern portion electrically connected with the power pins and a second pattern portion electrically connected with the signal pins, wherein the first pattern portion is formed to be bent in a shape of approximately 'U'; and
       a lead wire electrically connected with the first pattern portion.

12. The lens detachable camera of claim 11, wherein the power pins are electrically connected with a side of the first pattern portion, and the lead wire is electrically connected with another side of the first pattern portion.

13. The lens detachable camera of claim 11, wherein the power pins are connected with the first pattern portion by soldering.

14. The lens detachable camera of claim 11, wherein the lead wire is connected with a power supply unit of the DSLR camera.

15. The lens detachable camera of claim 11, wherein the second pattern portion is connected with a control unit of the lens detachable camera.

16. The lens detachable camera of claim 11, wherein a pattern related to power is formed in the first pattern portion, and a pattern related to an electric signal is formed in the second pattern portion.

17. The lens detachable camera of claim 11 wherein a plurality of via holes are formed in the pin housing, and the interface pins are received in the plurality of via holes.

18. The lens detachable camera of claim 11, wherein the signal pins contact the second pattern portion when the camera body is coupled with the lens unit, and the signal pins are separated from the second pattern portion when the camera body is separated from the lens unit.

19. The lens detachable camera of claim 11, wherein springs that provide predetermined elastic force are inserted into the interface pins, respectively.

20. The lens detachable camera of claim 19, wherein the springs provide the predetermined elastic force in a direction urging the interface pins to protrude from the camera body.

21. The lens detachable camera of claim 11, wherein the power pins are formed to have a longer length than the signal pins.

22. A lens detachable camera comprising:
    a camera body; and
    a lens unit which is attached to or detached from the camera body,
    wherein the camera body comprises:
       interface pins formed contactable with the lens unit, the interface pins comprising power pins and signal pins;
       a pin housing that receives therein the interface pins;
       a flexible printed circuit board (FPCB) comprising a first pattern portion electrically connected with the power pins and a second pattern portion electrically connected with the signal pins, wherein the signal pins contact the second pattern portion when the camera body is coupled with the lens unit, and the signal pins are separated from the second pattern portion when the camera body is separated from the lens unit; and
       a lead wire electrically connected with the first pattern portion.

23. The lens detachable camera of claim 22, wherein the power pins are electrically connected with a side of the first pattern portion, and the lead wire is electrically connected with another side of the first pattern portion.

24. The lens detachable camera of claim 22, wherein the power pins are connected with the first pattern portion by soldering.

25. The lens detachable camera of claim 22, wherein the lead wire is connected with a power supply unit of the lens detachable camera.

26. The lens detachable camera of claim 22, wherein the second pattern portion is connected with a control unit of the lens detachable camera.

27. The lens detachable camera of claim 22, wherein a pattern related to power is formed in the first pattern portion, and a pattern related to an electric signal is formed in the second pattern portion.

28. The lens detachable camera of claim 22, wherein a plurality of via holes are formed in the pin housing, and the interface pins are received in the plurality of via holes.

29. The lens detachable camera of claim 22, wherein springs that provide predetermined elastic force are inserted into the interface pins, respectively.

30. The lens detachable camera of claim 29, wherein the springs provide the predetermined elastic force in a direction urging the interface pins to protrude from the camera body.

31. The lens detachable camera of claim 22, wherein the power pins are formed to have a longer length than the signal pins.

* * * * *

UNITED STATES PATENT AND TRADEMARK OFFICE
CERTIFICATE OF CORRECTION

PATENT NO.         : 8,452,170 B2
APPLICATION NO.    : 13/008221
DATED              : May 28, 2013
INVENTOR(S)        : Seung-hyun Hwang et al.

Page 1 of 1

It is certified that error appears in the above-identified patent and that said Letters Patent is hereby corrected as shown below:

IN THE CLAIMS:

In Claim 14, Column 10, lines 5-6, replace "the DSLR camera" with

-- the lens detachable camera --

Signed and Sealed this
Twenty-seventh Day of August, 2013

Teresa Stanek Rea
*Acting Director of the United States Patent and Trademark Office*